US012481510B2

(12) United States Patent
Li

(10) Patent No.: US 12,481,510 B2
(45) Date of Patent: Nov. 25, 2025

(54) CIRCUITS AND METHODS FOR CONTROLLING DEBUGGING FIRMWARE IN INTEGRATED CIRCUIT DEVICES

(71) Applicant: Intel Corporation, Santa Clara, CA (US)

(72) Inventor: Sen Li, Austin, TX (US)

(73) Assignee: Altera Corporation, San Jose, CA (US)

( * ) Notice: Subject to any disclaimer, the term of this patent is extended or adjusted under 35 U.S.C. 154(b) by 641 days.

(21) Appl. No.: 17/848,298

(22) Filed: Jun. 23, 2022

(65) Prior Publication Data

US 2022/0318022 A1 Oct. 6, 2022

(51) Int. Cl.
G06F 9/445 (2018.01)
G06F 21/60 (2013.01)
H04L 9/32 (2006.01)

(52) U.S. Cl.
CPC ............ G06F 9/445 (2013.01); G06F 21/604 (2013.01); H04L 9/3247 (2013.01); H04L 9/3263 (2013.01)

(58) Field of Classification Search
CPC ........ G06F 9/445; G06F 21/604; G06F 21/76; G06F 21/85; H04L 9/3247; H04L 9/3263; H04L 9/088; H04L 9/3268
See application file for complete search history.

(56) References Cited

U.S. PATENT DOCUMENTS

| 6,038,551 A * | 3/2000 | Barlow ................ G06Q 20/367 380/278 |
| 9,596,082 B2 * | 3/2017 | Arthur, Jr. ............. G06F 21/629 |
| 9,946,826 B1 | 4/2018 | Atsatt et al. |
| 10,114,941 B2 * | 10/2018 | Pedersen ................. G06F 21/72 |
| 11,280,829 B1 * | 3/2022 | Poolla ................ G01R 31/3177 |
| 2015/0186682 A1 | 7/2015 | Brokish et al. |

FOREIGN PATENT DOCUMENTS

RU  2369024 C2 *  9/2009  ........... H04L 9/0822

* cited by examiner

Primary Examiner — Mohammed Waliullah
(74) Attorney, Agent, or Firm — InventIQ Legal LLP; Steven J. Cahill

(57) ABSTRACT

An integrated circuit device includes a storage circuit for storing a canceled value of a key identifier that is associated with a debug key used to sign debugging firmware. A security controller circuit is configurable to reactivate the key identifier to permit the debugging firmware to be loaded to the integrated circuit device to perform debugging functions by changing the canceled value of the key identifier stored in the first storage circuit to a reactivated value.

20 Claims, 4 Drawing Sheets

CIRCUITS AND METHODS FOR CONTROLLING DEBUGGING FIRMWARE IN INTEGRATED CIRCUIT DEVICES

FIELD OF THE DISCLOSURE

The present disclosure relates to electronic circuits, and more particularly, to circuits and methods for controlling debugging firmware in integrated circuit devices.

BACKGROUND

A programmable logic device (PLD), for example a field programmable gate array (FPGA), is an integrated circuit that includes programmable logic blocks and programmable routing. The programmable logic and routing can be configured with configuration data that can be loaded into the PLD from an external source. For modern PLDs, this configuration is mediated by one or more programmable processors and associated firmware embedded in the PLD. Many PLDs, including FPGAs, also typically include addressable Random Access Memory (RAM) and Read-Only Memory (ROM) associated with these processors and embedded firmware. For example, the ROM may contain processor instructions and other associated data that allows the FPGA to go through an initial boot process, and that boot process may include loading the RAM with additional processor instructions or associated data from an external source (such as header data contained in the external bitstream). The embedded ROM code or firmware may also contain instructions for performing security checks (such as calculating signing algorithms for authentication), or code for preforming debug and self-check operations.

DETAILED DESCRIPTION

Figure 1:
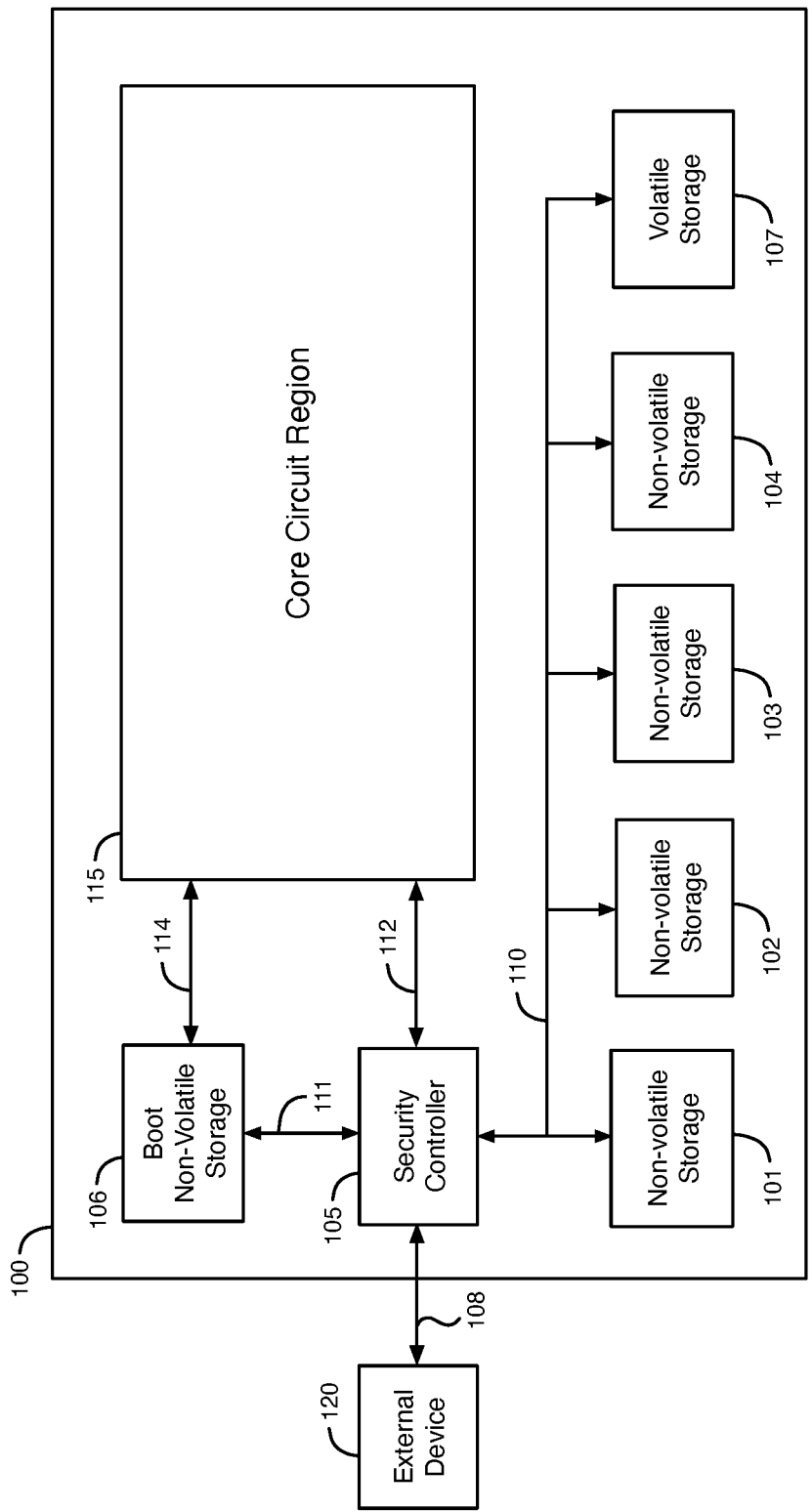
FIG. 1 is a diagram that illustrates an example of a circuit system that includes an integrated circuit (IC) device for performing operations disclosed herein and an external device.

Typically, a programmable logic device (PLD) is debugged using debugging firmware that is loaded into the PLD from an external source by an engineering loader. The engineering loader is signed with a production key so that the engineering loader can run on a security enabled PLD when an associated debug certificate is authenticated. Once the engineering loader is validated and running on the PLD, the engineering loader can re-personate the PLD using a debugging policy and/or an associated certificate, so that the signed debugging firmware can be loaded and run on the PLD.

The debugging firmware is signed with a non-production limited signing key so that the debugging firmware cannot be run on a security enabled production PLD, because the non-production limited signing key is cancelled on security enabled production PLDs. The engineering loader is typically used as middleware, so that non-production signed debug firmware can run on security enabled production PLDs.

There are disadvantages to using an engineering loader to debug a PLD. For example, engineering loaders typically require a significant engineering cost to maintain and update. Using an engineering loader to debug a PLD alters the debugging flow relative to the production flow of the PLD. As a result, the engineering loader may mask the cause of an issue (e.g., a bug), such that the issue can no longer be duplicated when the engineering loader is used in the PLD during the debugging flow. However, the issue may continue to occur in the PLD when the engineering loader is not used during the production flow. The engineering loader may also make the debugging flow harder to use. During the debugging flow, the PLD may be power cycled many times, and for each device power cycle, the debug engineer may perform multiple steps to load the debugging firmware, which prolongs the debugging process.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

According to some examples disclosed herein, techniques are provided for debugging security enabled production integrated circuit (IC) devices using debugging firmware that does not need to be signed with a non-production security feature. These techniques may be performed without the use of an engineering loader that has been signed with a production security feature. The techniques disclosed herein can decrease the engineering complexity, cost, and the time to debug a production IC device that has an enabled security feature using the same production flow that is used in the device during production, without the requirement of using an engineering loader.

According to some examples, an IC device may contain one or more non-volatile storage circuits that store information about the device. For example, one of the non-volatile storage circuits can store one or more values that indicate if the IC device is a manufacturer engineering device, a customer engineering device, or a production device. The non-volatile storage circuits may also store a production device debug key identifier (ID). In some implementations, the dedicated production device debug key ID is canceled (i.e., deactivated) when the IC device is manufactured. According to some examples, the IC device can also contain a boot storage circuit (e.g., having read-only memory (ROM) or write-protected flash memory). The boot storage circuit contains boot firmware (i.e., software) that is executed by the IC device after the IC device is powered on or reset.

According to some examples disclosed herein, the IC device can also include a security controller circuit that performs a signature verification (i.e., authentication) process to verify the authenticity of debugging firmware before allowing the debugging firmware to be loaded and run in the IC device. The security controller circuit also determines if the production device debug key ID is canceled by checking a value stored in a volatile storage circuit that is derived from a non-volatile storage circuit (such as fuses). If the production device debug key ID is not canceled, and the security controller circuit has successfully verified the signature of the debugging firmware, then the security controller circuit loads the debugging firmware into the IC device and allows the debugging firmware to run in the IC device.

In some implementations, all IC devices manufactured have the production device debug key ID cancelled. By default, debugging firmware signed with a production debug key cannot be authenticated, because the production device debug key ID is cancelled. The security controller circuit does not allow the debugging firmware to run on an IC device if the production device debug key ID on that IC device has been cancelled. If the production device debug key ID is canceled in the IC device, the security controller circuit can optionally reactivate the production device debug key ID to allow the debugging firmware to be loaded to and run on the IC device. To reactivate the production debug key ID, a debug certificate is provided to the IC device. The debug certificate contains the device identify to identify the particular device, and the certificate signature is signed with valid production keys. The production device debug key ID is only reactivated when the debug certificate is verified, and the device is an engineering device. For example, the security controller circuit may only allow the debugging firmware to run in the IC device if a value stored in the IC device indicates that the IC device is a manufacturer engineering device or a customer engineering device.

FIG. 1 is a diagram that illustrates an example of a circuit system that includes an integrated circuit (IC) device 100 and an external device. IC device 100 includes a security controller circuit 105, boot non-volatile storage circuit 106, non-voltage storage circuits 101-104, volatile storage circuit 107, and a core logic region 115. IC device 100 may be any type of IC, for example, a programmable logic IC, a microprocessor IC, an application specific IC, or a graphics processing unit (GPU) IC. The core circuit region 115 can include logic circuits that perform the core functions of the IC device 100. For example, if IC device 100 is a programmable logic IC, then the core circuit region 115 can include programmable logic circuit blocks that are configurable by configuration data to perform a custom circuit design for the IC. The circuit system of FIG. 1 also includes an external device 120 that is coupled to the IC device 100 through one or more conductors 108.

Boot non-volatile storage circuit 106 contains instructions (i.e., boot firmware) for performing a boot process for IC device 100. IC device 100 performs this boot process using the instructions stored in boot non-volatile storage circuit 106 each time that the IC device 100 is powered on or reset. Boot non-volatile storage circuit 106 communicates with security controller circuit 105 through bus 111. Boot non-volatile storage circuit 106 communicates with the logic circuits in the core circuit region 115 through bus 114. Boot non-volatile storage circuit 106 and non-volatile storage circuits 101-104 may, for example, include read-only memory (ROM), fuses, anti-fuses, flash memory, or any other type of non-volatile memory circuitry.

External device 120 can store and provide debugging firmware to security controller circuit 105 in IC device 100 through conductors 108. If various conditions are met as discussed in further detail herein, the IC device 100 can run the debugging firmware to debug issues with the operation of circuits in the core circuit region 115. The security controller circuit 105 can determine if the various conditions are met for running the debugging firmware by checking values stored in fields having predefined storage spaces in the storage circuits 101-104 and 107 through bus 110 as disclosed in further detail herein.

In the example of Figure (FIG. 1, non-volatile storage circuit 101 has a field (i.e., a dedicated storage space) for storing a key identifier (ID) value (e.g., 0) that is assigned to a limited signing key used by the manufacturer of the IC device 100 for firmware development purposes. Non-volatile storage circuit 102 has a field for storing the value of the production device debug key ID. For example, the non-volatile storage circuit 102 may store a value of 1 for the production device debug key ID. The production device debug key ID is assigned to a production debug key. The debugging firmware is signed with the production debug key. The production device debug key ID is typically canceled in IC device 100 during manufacturing. Non-volatile storage circuit 103 contains fields for storing the values of key IDs for additional keys. The key ID values stored in circuit 103 for these additional keys may, for example, be 2-K, where K is any integer number greater than 2. As an example, key ID values from 2 to 31 can be assigned to production keys, but more keys and key IDs can be allocated as needed depending on the storage space in circuit 103.

Non-volatile storage circuits 101-104 can include fuses, anti-fuses, flash memory, etc. As a specific example, 4 fuse bits in storage circuit 102 or 103 may correspond to a key ID, because in some cases, a blown fuse may be healed over time. If the key ID is canceled, all 4 fuse bits are blown. Then, when the key ID is accessed, the key ID is determined to be canceled if any of the 4 fuse bits are blown.

Non-volatile storage circuit 104 has fields for storing values that identify the IC device 100 as a manufacturer engineering device or as a customer engineering device. A manufacturer engineering device is an IC device that is intended to be used by the manufacturer of the IC device for testing and debugging purposes. A production device is an IC device that is intended to be used by an end user (e.g., a customer) of the IC device in an end user production application. A production device may be converted into a customer engineering device, as described in further detail below. In some implementations, one or more of the non-volatile storage circuits 101-104 can, for example, include fuses, anti-fuses, flash memory, or any combination thereof to store the values in the fields.

IC device 100 can, for example, be used as a manufacturer engineering device. The manufacturer of IC device 100 can, for example, produce an engineering device at the manufacturing stage by setting a field in non-volatile storage circuit 104 (e.g., by blowing one of the fuses) to indicate that the device is a manufacturer engineering device. In addition, a non-customer-owned IC device 100 can be turned into a manufacturer engineering device using a manufacturer signed device specific certificate. Once the IC device 100 is turned into a manufacturer engineering device, the IC device 100 is not sold to a customer, and the IC device 100 is not attestable.

As another example, IC device 100 can be turned into a customer engineering device if the IC device 100 is sold as a production device to a customer. If a customer finds one or more issues with IC device 100, the customer may want the IC manufacturer to debug IC device 100 to determine the root cause of the issue(s) and to potentially fix the issue(s). Once there is a per device certificate signed by both the customer and the IC manufacturer, a field in non-volatile storage circuit 104 can be set to indicate that the IC device 100 is a customer engineering device (e.g., a fuse can be blown). The security controller circuit 105 can apply a different protection policy when the IC device 100 is a customer engineering device. After the IC device 100 has been debugged, the customer can turn the IC device 100 back into a production device by setting another field (e.g., blowing another fuse) in non-volatile storage circuit 104. Thus, IC device 100 can be operated in a customer engineering device mode for debugging purposes. After the IC device has been debugged, the IC device 100 can exit the customer engineering device mode. If transitioning IC device 100 into and out of the customer engineering device mode involves blowing fuses in non-volatile storage circuit 104, then the IC device 100 is only allowed to enter and exit the customer engineering device mode a limited number of times (e.g., 3 times), because non-volatile storage circuit 104 has a limited number of fuse fields. The fuse fields in non-volatile storage circuit 104 are a permanent indication to the customer that the IC device 100 was involved in a debugging process.

The debugging process performed on IC device 100 may be the same regardless of whether the IC device 100 is a manufacturer engineering device or a customer engineering device. However, a different protection policy may be applied depending on whether the IC device 100 is a manufacturer engineering device or a customer engineering device. In some implementations, once the IC device 100 is identified as a manufacturer engineering device, IC device 100 cannot exit the manufacturer engineering device mode. However, if IC device 100 is a production device, then IC device 100 may enter and exit the customer engineering device mode in a predefined number of times.

Figure 2A:
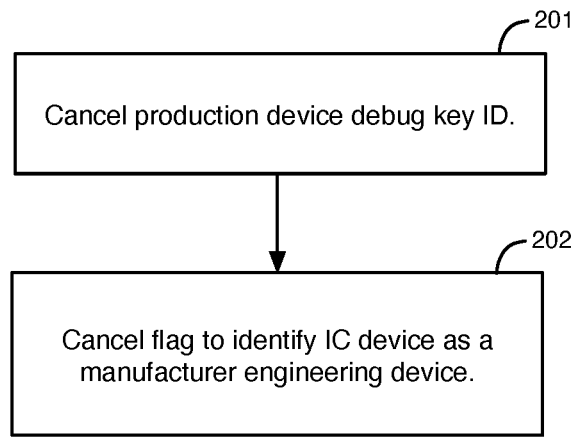
FIG. 2A is a flow chart that illustrates examples of operations that may be performed to identify an IC device as a manufacturer engineering device.

FIG. 2A is a flow chart that illustrates examples of operations that may be performed to identify an IC device as a manufacturer engineering device. The operations of FIG. 2A can be performed for any IC device that is intended to be used only as a manufacturer engineering device by a manufacturer of the IC device for the purpose of performing debugging functions using debugging firmware. The operations of FIGS. 2A-2B and 3 are discussed in the context of IC device 100 as an example.

In operation 201, the circuit system of FIG. 1 cancels the production device debug key identifier (ID) stored in non-volatile storage circuit 102 in IC device 100. The debugging firmware signed with the production debug key that is assigned to the production device debug key ID is not able to run in the IC device, while the production device debug key ID stored in non-volatile storage circuit 102 is cancelled. In some exemplary implementations, the production device debug key ID is always cancelled as part of the process of manufacturing the IC device 100. For example, if non-volatile storage circuit 102 in IC device 100 contains a fuse that is used to indicate if production device debug key ID is cancelled or not cancelled, then a bit stored in the fuse in non-volatile storage circuit 102 for the production device debug key ID is always cancelled (i.e., the fuse is blown) during the manufacturing process.

In operation 202, a flag stored in a field in non-volatile storage circuit 104 is cancelled to identify the IC device 100 as a manufacturer engineering device. As an example, a manufacturer of IC device 100 can manufacture a batch of IC devices 100 in which the flag stored in the non-volatile storage circuits 104 in these IC devices are cancelled (e.g., set to 0) to identify these IC devices as manufacturer engineering devices (e.g., by blowing fuses in non-volatile storage circuits 104). If the flag stored in non-volatile storage circuit 104 is cancelled to identify the IC device 100 as a manufacturer engineering device, then the IC device is not processed by a manufacturer certification process that attests a certificate for the IC device to enable an end user production flow. As a result, the IC device is not attestable through the production flow of an end user of the IC device. After operation 202, the security controller circuit 105 can verify that the flag stored in non-volatile storage circuit 104 is cancelled, thereby identifying IC device 100 as a manufacturer engineering device.

Figure 2B:
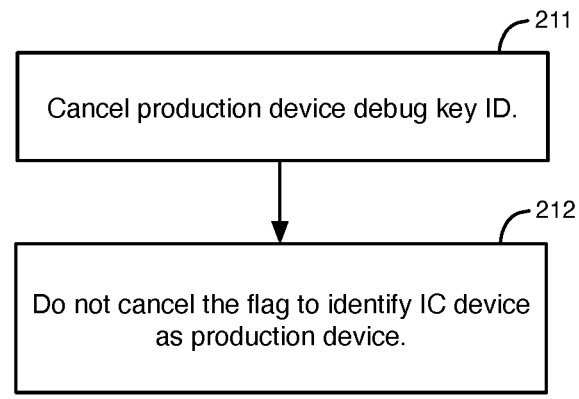
FIG. 2B is a flow chart that illustrates examples of operations that may be performed to identify an IC device as a production device that is intended to be used by an end user of the IC device in a production application.
Figure 3:
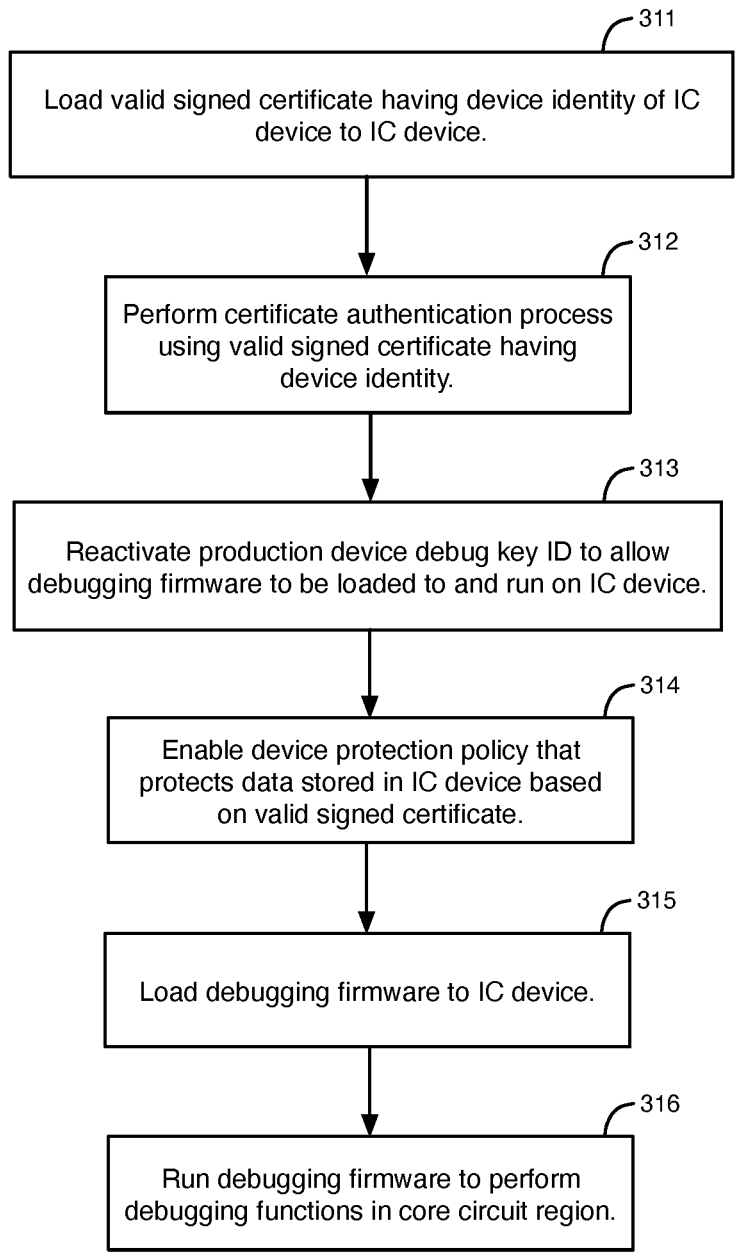
FIG. 3 is a flow chart that illustrates examples of operations that may be performed to load and run debugging firmware in an IC device that has been processed according to the operations of FIG. 2A or FIG. 2B.

FIG. 2B is a flow chart that illustrates examples of operations that may be performed to identify an IC device 100 as a production device that is intended to be used by an end user of the IC device in a production application. In operation 211, the circuit system of FIG. 1 cancels the production device debug key identifier (ID) stored in non-volatile storage circuit 102 in IC device 100, as disclosed herein with respect to operation 201. As discussed above, the debugging firmware cannot run in IC device 100, while the production device debug key ID stored in non-volatile storage circuit 102 is cancelled.

In operation 212, the flag stored in the field in non-volatile storage circuit 104 is not cancelled to identify the IC device 100 as a production device. Operations 211-212 may, for example, be performed by default for processing IC devices 100 that are not intended to be used as manufacturer engineering devices. As a more specific example that is not intended to be limiting, a fuse in non-volatile storage circuit 104 is not blown in operation 212. IC device 100 can then be processed by a manufacturer certification process that attests a certificate for the IC device to enable the end user production flow. Operations 211-212 may, for example, be performed by security controller circuit 105.

FIG. 3 is a flow chart that illustrates examples of operations that may be performed to load and run debugging firmware in an IC device that has been processed according to the operations of FIG. 2A or FIG. 2B. The operations of FIG. 3 can be performed for any IC device that is intended to be used as a customer engineering device or as a manufacturer engineering device. In operation 311, a valid signed certificate having a device identity that matches the device identity of the IC device (e.g., IC device 100) is loaded to the IC device. For example, the valid signed certificate may be loaded to security controller circuit 105 in operation 311. The code running on the security controller circuit 105 for performing operations 312-316 may be stored, for example, in boot non-volatile storage circuit 106.

In operation 312, the security controller circuit 105 performs a certificate authentication process using the valid signed certificate having the device identity of the IC device 100. The certificate may, for example, need to be signed by the end user and by the IC manufacturer in order for the security controller circuit 105 to authenticate the certificate as a valid signed certificate in operation 312. If the IC device 100 is a production device, the security controller circuit 105 converts the IC device 100 to a customer engineering device (e.g., by storing an additional value in non-volatile storage circuit 104), once the valid signed certificate is authenticated by the security controller circuit 105, so that debugging firmware can run on the IC device 100. The debugging firmware will not be able to run on any production devices that have not been authenticated and converted to customer engineering devices using operations 311-312. The circuit system of FIG. 1 can also include a defined process to convert the IC device from a customer engineering device back to a production device.

If the security controller circuit 105 determines that the IC device is a manufacturer or customer engineering device with a valid signed certificate, then in operation 313, the security controller circuit 105 reactivates the production device debug key ID to allow the debugging firmware signed with the production debug key to be loaded to and run in IC device 100. As an example, the value of the production device debug key ID is only read from non-volatile storage circuit 102 (e.g., by security controller circuit 105) when IC device 100 powers up. The value of the production device debug key ID is then stored in volatile storage circuit 107 (e.g., in a protected random access memory circuit). The security controller circuit 105 then accesses the value of the production device debug key ID from volatile storage circuit 107 in operation 313, so that non-volatile storage circuit 102 is not accessed again. The security controller circuit 105 can re-activate the production device debug key ID in operation 313 by changing the value of the production device debug key ID that is stored in the volatile storage circuit 107 to a value that indicates that the production device debug key ID is not canceled. The security controller circuit 105 can then use the production debug key assigned to the reactivated production device debug key ID to verify the signature of the debugging firmware. Firmware stored in the boot storage circuit 106 can be used to establish a secure trust boot chain for the authentication of the debugging firmware.

In operation 314, the security controller circuit 105 enables a device protection policy that protects data stored in the IC device 100 based on the valid signed certificate. The security controller circuit 105 can implement the device protection policy to ensure that sensitive data stored in IC device 100 is not used or leaked during the debugging process by running instructions stored in the boot non-volatile storage circuit 106. The security controller circuit 105 enables the device protection policy based on the device state (e.g., the certificated being authenticated) before loading the debugging firmware.

In operation 315, the debugging firmware is loaded to the IC device 100. For example, the debugging firmware signed with the production debug key can be stored inside the external device 120 and loaded into the security controller 105 and/or circuits in the core circuit region 115 in operation 315. The security controller circuit 105 loads the debugging firmware from external device 120 to IC device 100 if the debug key for signing the debugging firmware that is associated with the production device debug key ID is properly authenticated. As part of the debugging process, multiple copies of the debugging firmware may be loaded to IC device 100 and run on IC device 100. The security controller circuit 105 can contain a boot loader that performs operations 311-314 to establish a secure boot trust chain that cannot be altered. In operation 316, the debugging firmware is run in IC device 100 to perform debugging functions for the circuits in the core circuit region 115. The debugging firmware can, for example, be run in security controller circuit 105 and/or using logic circuits in core circuit region 115.

In general, software and data for performing any of the functions disclosed herein may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Figure 4:
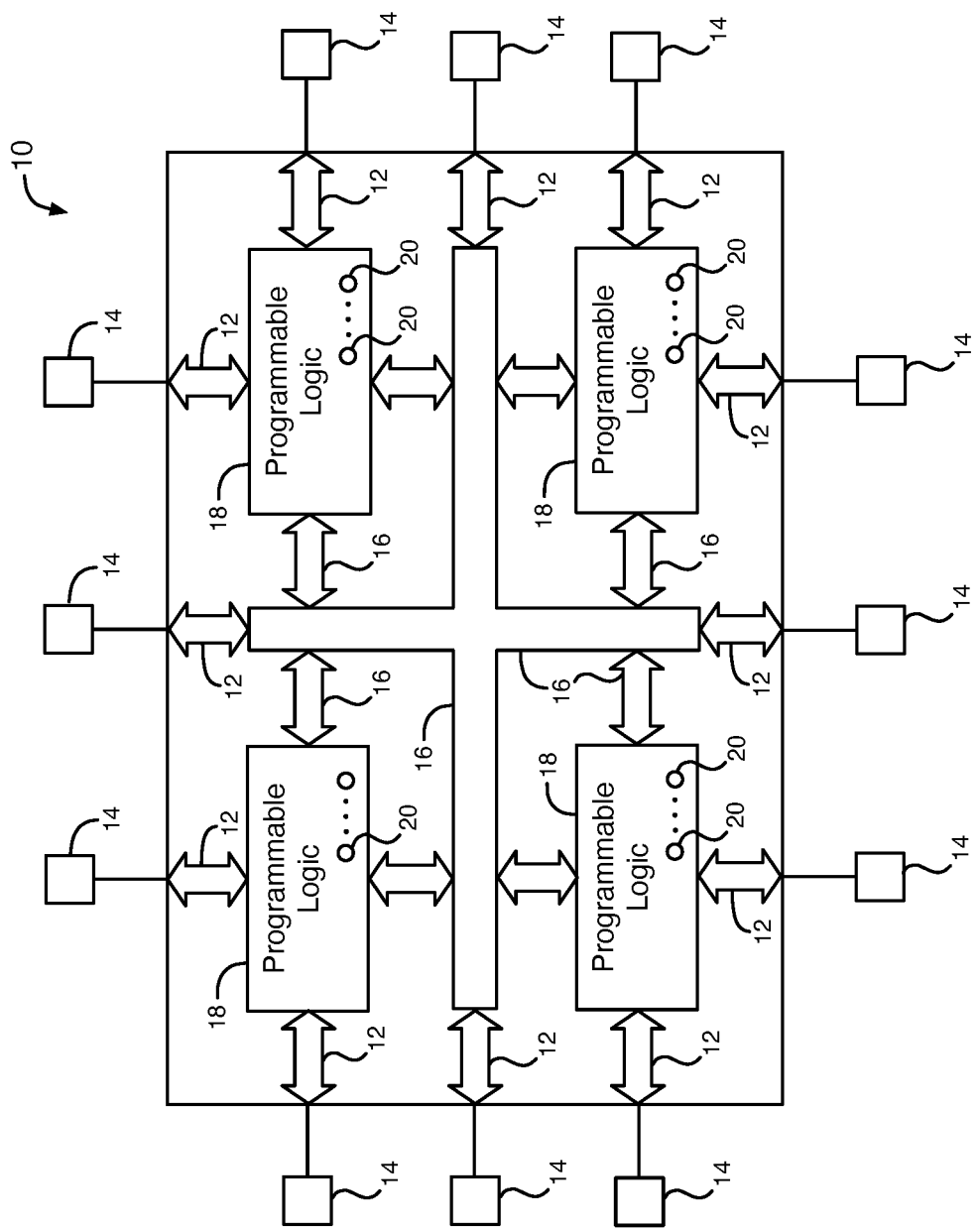
FIG. 4 is a diagram of an illustrative programmable (i.e., configurable) logic integrated circuit (IC) that may be programmed according to a user circuit design.

FIG. 4 is a diagram of an illustrative programmable (i.e., configurable) logic integrated circuit (IC) 10 that may be programmed according to a user circuit design. As shown in FIG. 4, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. Programmable logic circuitry 18 may be configured to perform custom logic functions. Core circuit region 115 may include programmable logic circuitry 18.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in programmable logic circuitry 18. Typically, the memory element output signals are used to control the gates of field-effect transistors. In the context of programmable integrated circuits, the memory elements 20 store configuration data and are sometimes referred to as configuration random-access memory (CRAM) cells. The configuration data programs the programmable logic circuitry 18 to perform the custom logic functions according to the circuit design.

Additional example are now described. Example 1 is an integrated circuit device comprising: a first storage circuit for storing a canceled value of a key identifier that is associated with a debug key used to sign debugging firmware; and a security controller circuit configurable to reactivate the key identifier to permit the debugging firmware to be loaded to the integrated circuit device to perform debugging functions by changing the canceled value of the key identifier stored in the first storage circuit to a reactivated value.

In Example 2, the integrated circuit device of Example 1 further comprises: a second non-volatile storage circuit that stores the canceled value of the key identifier, wherein the security controller circuit is configurable to access the canceled value of the key identifier from the second non-volatile storage circuit and to store the canceled value of the key identifier in the first storage circuit.

In Example 3, the integrated circuit device of any one of Examples 1-2 may optionally include, wherein the security controller circuit is configurable to enable a device protection policy that protects data stored in the integrated circuit device while the debugging firmware is run in the integrated circuit device.

In Example 4, the integrated circuit device of any one of Examples 1-3 may optionally include, wherein the security control circuit is configurable to prevent the debugging firmware from being loaded into the integrated circuit device based on the canceled value of the key identifier stored in the first storage circuit.

In Example 5, the integrated circuit device of any one of Examples 1-4 may optionally include, wherein the security controller circuit is configurable to perform a certificate authentication procedure using a valid signed certificate having a device identity of the integrated circuit device to convert the integrated circuit device from a production device to a customer engineering device.

In Example 6, the integrated circuit device of Example 5 may optionally include, wherein the security controller circuit is configurable to load the debugging firmware to the integrated circuit device based on the key identifier having been reactivated and based on the integrated circuit device having been converted to the customer engineering device.

In Example 7, the integrated circuit device of any one of Examples 1-6 may optionally include, wherein the security controller circuit is configurable to allow the debugging firmware to run in the integrated circuit device based on the key identifier having been reactivated.

In Example 8, the integrated circuit device of any one of Examples 1-7 further comprises: a second storage circuit, wherein the security controller circuit is configurable to cancel a flag stored in the second storage circuit to identify the integrated circuit device as an engineering device, and wherein the security controller circuit is configurable to allow the debugging firmware to be loaded and run in the integrated circuit device based on the flag being cancelled.

Example 9 is a method for controlling debugging firmware in an integrated circuit device, the method comprising: preventing the debugging firmware from loading to the integrated circuit device based on a value of a key identifier stored in the integrated circuit device indicating that the key identifier has been deactivated, wherein the key identifier is assigned to a debug key used to sign the debugging firmware; and reactivating the key identifier by changing the value of the key identifier stored in the integrated circuit device to permit the debugging firmware to be loaded to the integrated circuit device to perform debugging functions.

In Example 10, the method of Example 9 further comprises: accessing the value of the key identifier from a non-volatile storage circuit in the integrated circuit device; and storing the value of the key identifier accessed from the non-volatile storage circuit in a volatile storage circuit in the integrated circuit device.

In Example 11, the method of any one of Examples 9-10 further comprises: using the debug key to verify a signature of the debugging firmware.

In Example 12, the method of any one of Examples 9-11 further comprises: operating a device protection policy that protects data stored in the integrated circuit device using a security controller circuit in the integrated circuit device while the debugging firmware is run in the integrated circuit device.

In Example 13, the method of any one of Examples 9-12 further comprises: performing a certificate authentication procedure using a valid signed certificate having a device identity of the integrated circuit device to convert the integrated circuit device from a production device to a customer engineering device.

In Example 14, the method of any one of Examples 9-13 further comprises: canceling a flag stored in a storage circuit in the integrated circuit device to identify the integrated circuit device as an engineering device; and allowing the debugging firmware to be loaded and run in the integrated circuit device based on the flag being cancelled.

In Example 15, the method of any one of Examples 9-14 further comprises: running the debugging firmware in the integrated circuit device based on the key identifier having been reactivated.

Example 16 is a non-transitory computer-readable storage medium comprising instructions stored thereon for causing a computer to execute a method for controlling debugging firmware in an integrated circuit device, the method comprising: accessing a value of a key identifier stored in the integrated circuit device indicating that the key identifier has been canceled, wherein the debugging firmware is signed with a debug key associated with the key identifier; and reactivating the key identifier using a security controller circuit to permit the debugging firmware to run in the integrated circuit device by changing the value of the key identifier stored in the integrated circuit device.

In Example 17, the non-transitory computer-readable storage medium of Example 16, wherein the method further comprises: performing a certificate authentication procedure using a valid signed certificate having a device identity of the integrated circuit device to convert the integrated circuit device from a production device to a customer engineering device.

In Example 18, the non-transitory computer-readable storage medium of any one of Examples 16-17, wherein the method further comprises: loading the debugging firmware to the integrated circuit device based on the key identifier having been reactivated.

In Example 19, the non-transitory computer-readable storage medium of any one of Examples 16-18, wherein the method further comprises: operating a device protection policy that protects data stored in the integrated circuit device using the security controller circuit while the debugging firmware is run in the integrated circuit device.

In Example 20, the non-transitory computer-readable storage medium of any one of Examples 16-19, wherein the method further comprises: running the debugging firmware in the integrated circuit device based on the debug key identifier having been reactivated.

It will be recognized by one skilled in the art, that the present examples may be practiced without some or all of these specific details. In other instances, well-known operations have not been described in detail in order not to unnecessarily obscure the present examples. The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:
1. An integrated circuit device comprising:
a first storage circuit for storing a canceled value of a key identifier that is associated with a debug key used to sign debugging firmware; and
a security controller circuit configurable to reactivate the key identifier to permit the debugging firmware to be loaded to the integrated circuit device to perform debugging functions by changing the canceled value of the key identifier stored in the first storage circuit to a reactivated value.

2. The integrated circuit device of claim 1 further comprising:
a second non-volatile storage circuit that stores the canceled value of the key identifier, wherein the security controller circuit is configurable to access the canceled value of the key identifier from the second non-volatile storage circuit and to store the canceled value of the key identifier in the first storage circuit.

3. The integrated circuit device of claim 1, wherein the security controller circuit is configurable to enable a device protection policy that protects data stored in the integrated circuit device while the debugging firmware is run in the integrated circuit device.

4. The integrated circuit device of claim 1, wherein the security control circuit is configurable to prevent the debugging firmware from being loaded into the integrated circuit device based on the canceled value of the key identifier stored in the first storage circuit.

5. The integrated circuit device of claim 1, wherein the security controller circuit is configurable to perform a certificate authentication procedure using a valid signed certificate having a device identity of the integrated circuit device to convert the integrated circuit device from a production device to a customer engineering device.

6. The integrated circuit device of claim 5, wherein the security controller circuit is configurable to load the debugging firmware to the integrated circuit device based on the key identifier having been reactivated and based on the integrated circuit device having been converted to the customer engineering device.

7. The integrated circuit device of claim 1, wherein the security controller circuit is configurable to allow the debugging firmware to run in the integrated circuit device based on the key identifier having been reactivated.

8. The integrated circuit device of claim 1 further comprising:
a second storage circuit, wherein the security controller circuit is configurable to cancel a flag stored in the second storage circuit to identify the integrated circuit device as an engineering device, and wherein the security controller circuit is configurable to allow the debugging firmware to be loaded and run in the integrated circuit device based on the flag being cancelled.

9. A method for controlling debugging firmware in an integrated circuit device, the method comprising:
preventing the debugging firmware from loading to the integrated circuit device based on a value of a key identifier stored in the integrated circuit device indicating that the key identifier has been deactivated, wherein the key identifier is assigned to a debug key used to sign the debugging firmware; and
reactivating the key identifier by changing the value of the key identifier stored in the integrated circuit device to permit the debugging firmware to be loaded to the integrated circuit device to perform debugging functions.

10. The method of claim 9 further comprising:
accessing the value of the key identifier from a non-volatile storage circuit in the integrated circuit device; and
storing the value of the key identifier accessed from the non-volatile storage circuit in a volatile storage circuit in the integrated circuit device.

11. The method of claim 9 further comprising:
using the debug key to verify a signature of the debugging firmware.

12. The method of claim 9 further comprising:
operating a device protection policy that protects data stored in the integrated circuit device using a security controller circuit in the integrated circuit device while the debugging firmware is run in the integrated circuit device.

13. The method of claim 9 further comprising:
performing a certificate authentication procedure using a valid signed certificate having a device identity of the integrated circuit device to convert the integrated circuit device from a production device to a customer engineering device.

14. The method of claim 9 further comprising
canceling a flag stored in a storage circuit in the integrated circuit device to identify the integrated circuit device as an engineering device; and
allowing the debugging firmware to be loaded and run in the integrated circuit device based on the flag being cancelled.

15. The method of claim 9 further comprising:
running the debugging firmware in the integrated circuit device based on the key identifier having been reactivated.

16. A non-transitory computer-readable storage medium comprising instructions stored thereon for causing a computer to execute a method for controlling debugging firmware in an integrated circuit device, the method comprising:
accessing a value of a key identifier stored in the integrated circuit device indicating that the key identifier has been canceled, wherein the debugging firmware is signed with a debug key associated with the key identifier; and
reactivating the key identifier using a security controller circuit to permit the debugging firmware to run in the integrated circuit device by changing the value of the key identifier stored in the integrated circuit device.

17. The non-transitory computer-readable storage medium of claim 16, wherein the method further comprises,
performing a certificate authentication procedure using a valid signed certificate having a device identity of the integrated circuit device to convert the integrated circuit device from a production device to a customer engineering device.

18. The non-transitory computer-readable storage medium of claim 16, wherein the method further comprises:
loading the debugging firmware to the integrated circuit device based on the key identifier having been reactivated.

19. The non-transitory computer-readable storage medium of claim 16, wherein the method further comprises:
operating a device protection policy that protects data stored in the integrated circuit device using the security controller circuit while the debugging firmware is run in the integrated circuit device.

20. The non-transitory computer-readable storage medium of claim 16, wherein the method further comprises:
running the debugging firmware in the integrated circuit device based on the debug key identifier having been reactivated.

* * * * *